United States Patent Office 3,351,665
Patented Nov. 7, 1967

3,351,665
PREPARATION OF PERHALOACETONES
Everett E. Gilbert, Morris Township, Morris County, N.J., and Basil S. Farah, Allentown, Pa., assignors to Allied Chemical Corporation, New York, N.Y., a corporation of New York
No Drawing. Filed May 12, 1964, Ser. No. 366,893
5 Claims. (Cl. 260—593)

This invention relates to perhaloacetones containing bromine substituents and to a method for their preparation. More particularly, this invention relates to perhaloacetones containing one to two bromine substituents and to a method for their preparation from hexachloroacetone or a perhaloacetone containing both chlorine and fluorine substituents.

Perchloroacetone and perhaloacetones containing both chlorine and fluorine substituents are known compounds and those commercially available include $F_3CCOCF_2Cl$, $F_2ClCCOCF_2Cl$, $F_2ClCCOCFCl_2$ and $FCl_2CCOCFCl_2$. Perhaloacetones containing bromine substituents are not generally known compounds, although $BrCl_2CCOCCl_2Br$ is shown in Beilstein I at page 658 as having been made by procedures involving cleavage of a five membered ring at two points with loss of two carbon atoms.

In accordance with the present invention, it has been found that perhaloacetones containing one to two bromine substituents can be prepared in good yield in a simple one step procedure by reacting aluminum bromide with hexachloroacetone or a perhaloacetone containing both chlorine and fluorine substituents. The reaction proceeds rapidly with evolution of heat so that it is preferable slowly to add the aluminum bromide to the perhaloacetone, advantageously with stirring and external cooling. The reaction temperature can thus range generally from about $-20°$ C. up to the lower of the boiling point of the perhaloacetone reactant and the reaction product. The reaction proceeds at atmospheric pressure although subatmospheric and superatmospheric pressures can be employed. Depending upon the reaction temperature and the rate of addition of aluminum bromide, the reaction time varies generally from about one-half to 30 hours, one to two hours usually being sufficient at lower temperatures. The ratio of reactants can vary widely but generally is in the range of about 0.3 to 2 moles of aluminum bromide per mole of perhaloacetone. Surprisingly, hexafluoroacetone does not react with aluminum bromide under these reaction conditions to give identifiable products.

The bromine-containing perhaloacetones produced according to the present invention are useful for a variety of purposes including use as chemical intermediates, as heat transfer agents, as nematocides, as contact weed killers, and as fungicides.

The following examples illustrate in detail the method of the invention.

EXAMPLE I

The experiment was carried out in a 3-neck flask equipped with a stirrer, a thermometer, a condenser protected by a drying tube, an inlet tube for nitrogen, and solid adding equipment. Sym-tetrafluorodichloroacetone in the amount of 99.5 grams (0.5 mole) was placed in the flask and treated with stirring with 80 grams (0.3 mole) of aluminum bromide at such a rate that the reaction temperature was maintained below 20° C. by cooling the flask in an ice bath. After the addition was completed, the mixture was stirred for one hour with external cooling, allowed to reach room temperature and finally heated cautiously to reflux for one hour. A 90° C. temperature was attained and bromine was given off. The mixture was poured into water, the organic layer was removed, the aqueous layer was washed twice with 30 ml. portions of methylene chloride, the combined organic portions were washed with water, dried over sodium sulfate and then distilled. There was obtained 34.5 grams of $$F_2ClCCOCClBr_2$$

boiling at 55–56° at 12 mm. Hg absolute and having as a density of $d_4^{20}$ 2.19. Calculated for $C_3F_2Br_2Cl_2O$; F, 11.8%. Found: 11.4, 11.5%.

EXAMPLE II

In the same equipment as Example I, sym-tetrafluorodichloroacetone in the amount of 200 grams (1.0 mole) was cooled to 0° C. and treated with 133.5 grams (0.5 mole) of aluminum bromide in one hour while a temperature of 0–5° C. was maintained. The mixture was allowed to stand at 0–5° C. for 1.5 hours, then at room temperature overnight. The excess ketone reactant was removed on a steam bath and the residue was poured on ice. The organic layer was separated, washed with 5% sodium bisulfite solution, then with cold water and dried over sodium sulfate. Distillation gave 85 grams of $$F_2ClCCOCClBr_2$$

boiling at 58–59° at 14 mm. Hg absolute. 34 grams of the acetone reactant were recovered so that the yield was 32%. Calculated for $C_3F_2Br_2Cl_2O$: F, 11.8%; Br, 52.0%; Cl, 22.0%. Found: F, 11.5%; Br, 52.7%; Cl, 20%. The infrared spectrum for this product was identical with that of the product of Example I.

EXAMPLE III

In the same manner sym-difluorotetrachloroacetone in the amount of 232 grams (1.0 mole) was treated at 0° C. with 133.5 grams (0.5 mole) of aluminum bromide in one hour. The reaction mixture was allowed to stand one hour at 0° C., then was heated cautiously on a steam bath for one hour. It was poured on ice, the organic layer was removed, washed with water, 5% sodium bisulfite, and then once more with water. It was dried over anhydrous sodium sulfate and fractionated to give two major components, $FCl_2CCOCCl_2Br$ boiling at 84–88° at 20 mm. Hg absolute and $BrCl_2CCOCCl_2Br$ boiling at 92–95° at 2 mm. Hg absolute. Calculated for $C_3BrFCl_4O$: F, 6.5%. Found, F, 5.9%.

EXAMPLE IV

Aluminum bromide in the amount of 267 grams (1.0 mole) was added to sym-difluorotetrachloroacetone in the amount of 232 grams (1.0 mole) at such a rate that the temperature rose gradually to 130° C. After standing overnight the solid mass was transferred to a beaker containing 500 ml. methylene chloride and one kilogram of ice. The mixture was stirred for several hours and transferred to a separator funnel. The organic layer was withdrawn, washed with dilute sodium bisulfite solution, dried over sodium sulfate and concentrated to 200 ml. by heating on a steam bath. The concentrate was cooled in a Dry Ice-acetone bath to $-60°$ and deposited 220 grams of crude solid which upon recrystallization from petroleum ether gave two crops, one of 140 grams melting at 73–75° being $BrCl_2CCOCCl_2Br$ and the other of 48 grams melting at 50–60° C. being $FCl_2CCOCCl_2Br$. The experiment was repeated twice with similar results.

EXAMPLE V

Aluminum bromide in the amount of 134 grams (0.5 mole) was added in portions to hexachloroacetone in the amount of 200 grams (0.76 mole) such that the reaction temperature did not rise about 80° C. The mixture was then stirred until reaction was complete and the temperature dropped to room temperature. Methylene chloride, 100 ml., and 200 ml. 5% sodium bisulfite solution, were added to the mixture which was then transferred to a separatory funnel. The organic layer was removed and washed with sodium bisulfite solution until a nearly colorless solution was obtained. The methylene chloride solution was then washed with cold water, dried over sodium sulfate and concentrated on a hot plate until a temperature of 130° C. was reached. The residue was fractionated at 5–8 mm. Hg absolute to give 87 grams of unreacted hexachloroacetone, 39 grams of crude product boiling at 105–110° C. at 5 mm. Hg absolute, 37 grams of $$Cl_3CCOCCl_2Br$$

boiling at 110–120° C. at 5 mm. Hg absolute, and 68 grams of $BrCl_2CCOCCl_2Br$ boiling at 120–130° C. at 5 mm. Hg absolute which solidified and melting near 80° C. after recrystallization from petroleum ether.

In place of the perhaloacetone reactants of the above examples, others can be employed such as $F_3CCOCF_2Cl$, $F_2ClCCOCFCl_2$, $F_3CCOCFCl_2$, $F_3CCOCCl_3$, and $$F_2ClCCOCCl_3$$

The compound of Examples 1 and 2 was found to have nematocidal activity in that it gave 100° kill of sour paste nematodes (*Panagrellus redivivus*) at 100 parts per million and over 90% kill at 50 parts per million using the standard laboratory Petri-dish procedure.

Two of the compounds of Examples III, IV and V, i.e., $Cl_3CCOCCl_2Br$ and $BrCl_2CCOCCl_2Br$, were found to have activity as contact (post-emergence) weed killers using the test method of Shaw and Swanson reported in "Weeds," volume 4, pp. 352–365 (July 1952). Eleven days after application, compound $Cl_3CCOCCl_2Br$ gave complete kill (injury rating of 10) for rape, which is representative of broadleaf weeds. It gave moderate injury on ryegrass (injury rating 4), which represents grassy weeds. Compound $BrCl_2CCOCCl_2Br$ gave corresponding ratings of 10 and 8, the latter figure corresponding to severe injury.

The compound of Examples I and II was found to have fungicidal activity. Even at 1 p.p.m., it completely inhibited spore germination of Sclerotinia (brown rot), and at 10 p.p.m. it completely inhibited germination of Stemphylium (target spot).

For practical use to control nematodes, plants and fungi, these compounds would be formulated as water-dispersible powders or pastes, fine or granular dusts, solutions or emulsifiable concentrates for dispersion in liquid carriers.

The embodiments of the invention in which an exclusive property or privilege is claimed are defined as follows:

1. A process for the preparation of perhaloacetones containing one to two bromine substituents which comprises reacting a perhaloacetone selected from the class consisting of hexachloroacetone and fluorochloroacetones selected from the group consisting of $F_2ClCCOCClF_2$, $FCl_2CCOCCl_2F$, $F_3CCOCF_2Cl$, $F_2ClCCOCFCl_2$, $$F_3CCOCFCl_2$$

$F_3CCOCCl_3$ and $F_2ClCCOCCl_3$ with aluminum bromide.

2. The process of claim 1 wherein the perhaloacetone reacted with aluminum bromide is hexachloroacetone.

3. The process of claim 1 wherein the perhaloacetone reacted with aluminum bromide is a fluorochloroacetone.

4. The process of claim 3 wherein the fluorochloroacetone is sym-tetrafluorodichloroacetone.

5. The process of claim 3 wherein the fluorochloroacetone is sym-difluorotetrachloroacetone.

References Cited

UNITED STATES PATENTS 1,891,415   12/1932   Harlow et al. _____ 260—658

OTHER REFERENCES

McBee et al., J. Amer. Chem. Soc. 74, 3902–3904 (1952).

Shepard et. al., J. Org. Chem. 23, 2012–2013 (1958).

LEON ZITVER, *Primary Examiner.*

DANIEL D. HORWITZ, *Examiner.*